United States Patent
Askin et al.

(10) Patent No.: US 8,981,651 B2
(45) Date of Patent: Mar. 17, 2015

(54) TIERED SENSING AND RESOURCE ALLOCATION SYSTEM FOR ENERGY USE OPTIMIZATION IN COMMERCIAL BUILDINGS

(75) Inventors: Amanda C. Askin, Dublin, CA (US); Kincho H. Law, Cupertino, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 502 days.

(21) Appl. No.: 13/543,789

(22) Filed: Jul. 7, 2012

(65) Prior Publication Data

US 2013/0038217 A1 Feb. 14, 2013

Related U.S. Application Data

(60) Provisional application No. 61/522,515, filed on Aug. 11, 2011.

(51) Int. Cl.
 *H05B 37/02* (2006.01)
(52) U.S. Cl.
 CPC .................................. *H05B 37/0245* (2013.01)
 USPC .......................................... 315/151; 315/291
(58) Field of Classification Search
 CPC ........... H05B 37/0245; H05B 37/0254; H05B 37/0272
 USPC ......... 315/149, 150, 151, 152, 153, 155, 158, 315/291
 See application file for complete search history.

(56) References Cited

U.S. PATENT DOCUMENTS

| | | | |
|---|---|---|---|
| 5,394,324 A | 2/1995 | Clearwater | |
| 5,812,422 A | 9/1998 | Lyons | |
| 6,307,331 B1 * | 10/2001 | Bonasia et al. | 315/294 |
| 7,019,276 B2 * | 3/2006 | Cloutier et al. | 250/214 AL |
| 8,810,137 B2 * | 8/2014 | Dahlen et al. | 315/152 |
| 2004/0002792 A1 | 1/2004 | Hoffknecht | |
| 2011/0245938 A1 | 10/2011 | Picco | |

OTHER PUBLICATIONS

Ota, "The Application of Wireless Sensor Networks to Residential Energy Efficiency and Demand Response." PhD Dissertation, UC Berkeley, 2007.
Singhvi et al. "Intelligent Light Control using Sensor Networks," SenSys'05, Nov. 2-4, 2005, San Diego, California, USA.

* cited by examiner

*Primary Examiner* — Jeffrey Zweizig
(74) *Attorney, Agent, or Firm* — Lumen Patent Firm

(57) ABSTRACT

A building lighting control system includes a central building server, distributed zone controllers, and light sensors and control units in each zone. Using occupant lighting preferences, occupancy state, and light levels, each zone controller computes a utility curve which represents the relationship between energy use and service level in the zone. The building server zone receives utility curves from all the zones and allocates energy units to the zones based on the utility curves using a utility-based trading algorithm in order to optimize service levels with minimal energy. Each zone controller then distributes energy to lights in its zone based on energy units allocated to the zone by the building server and based also on influence matrices representing the influences of the lights in the zone upon the sensors in the zone. The building server may also compute and output long-term operational information of the building.

5 Claims, 7 Drawing Sheets

Fig. 1

100
Zone controller collects occupant lighting preferences and light levels from light sensors distributed in the zone.

102
Zone controller then computes a utility curve for the zone

104
Zone controller then sends the utility curve for the zone to the building server.

106
Building server receives all utility curves from the zone controllers in the building.

108
Building server allocates energy units to the zones based on utility curves using a utility-based trading algorithm.

110
Zone controller then distributes energy to lights in its zone based on energy units allocated to the zone by the building server and based also on influence matrices representing the influences of the lights in the zone upon the sensors in the zone.

TIERED SENSING AND RESOURCE ALLOCATION SYSTEM FOR ENERGY USE OPTIMIZATION IN COMMERCIAL BUILDINGS

CROSS-REFERENCE TO RELATED APPLICATIONS

This application claims priority from U.S. Provisional Patent Application 61/522,515 filed Aug. 11, 2011, which is incorporated herein by reference.

FIELD OF THE INVENTION

The present invention relates generally to methods and systems for building control systems. More specifically, it relates to tiered lighting control systems for buildings.

BACKGROUND OF THE INVENTION

Building lighting control management systems are designed to help automate the adjustment of lighting levels inside buildings to appropriate levels, often while also attempting to reduce unnecessary lighting and energy use. Typically, such systems use either a completely decentralized or completely centralized approach.

Decentralized systems enable quick local response but are unable to provide centralized information regarding the full state of the building. Fully centralized systems can be slow to respond to changes in conditions and require large stores of data. The systems are typically designed around the optimization of a single parameter or a single function inherently balancing multiple parameters. Where a single parameter is optimized, usually either comfort or energy, the impact the system has on multiple performance parameters is overlooked. Existing methods typically do not allow for flexibility in addressing variable conditions across a space nor do they allow for the incorporation of variable preferences. These systems are also incapable of truly optimizing restricted energy resources across a building and cannot inform decision makers of the performance costs of energy use reduction. Moreover, such systems are not able to provide rapid updating and response times, especially in large buildings. Accordingly, there is a need in the art for improved lighting control systems that address these outstanding problems. It would also be desirable to provide a system that allows a building manager to assess the tradeoffs between energy use and quality of service provided to occupants.

SUMMARY OF THE INVENTION

Embodiments of the present invention provide quality occupant performance while optimizing energy use for lighting in a commercial office building utilizing distributed sensing and control. A system according to preferred embodiments has zone-level controllers that gather set point preferences from building occupants, measure current actual light levels associated with the preferences, and regularly update light settings based on stored mappings of light fixtures to sensors to best meet the preferred light levels while minimizing energy use. A building-level server in the lighting control system defines energy use in terms of utility and uses utility curves reported by the zone controllers to determine resource allocation to the zones. The system combines distributed and centralized control to allow the building level to make appropriate energy allocations without being taxed with the burden of processing raw sensor data from the entire building. The decentralized, distributed zone controllers are able to respond quickly to changes and update lighting scenes as necessary while the centralized building level server is able to monitor system performance, set total energy use limits, initialize demand response, and manage the quality of the occupant experience. The system also allows a building manager to explicitly view the tradeoff between energy savings and performance for the occupants by incorporating occupant preferences into the allocation scheme.

According to one aspect, the invention provides a system and method for lighting control of a building. The system includes a building server that communicates with zone controllers distributed in zones throughout the building. Each zone controller in turn communicates with sensors and lights in the zone. The zone controller collects occupant lighting preferences and light levels from light level sensors distributed in the zone. The zone controller then computes a utility curve for the zone, where the utility curve represents the relationship between energy use and service level provided to occupants of the zone. The zone controller then sends the utility curve for the zone to the building server. The building server zone receives the utility curve as well as all other utility curves from all the zone controllers in the building. The building server then allocates energy units to the zones based on the utility curves using a utility-based trading algorithm in order to optimize service levels with minimal energy. In some cases, an initial allocation may use a modified greedy algorithm. The allocation is communicated to the zone controllers. Each zone controller then distributes energy to lights in its zone based on energy units allocated to the zone by the building server and based also on influence matrices representing the influences of the lights in the zone upon the sensors in the zone.

In some embodiments, the building server also supervises trading of energy units between the zones as the dynamics of the building change over time. Furthermore, the building server may compute and output long-term operational information of the building, allowing review by a building manager. For example, in some cases, the building server may compute from the allocated energy units a building energy use utility curve for lighting of the building.

Embodiments of the present invention provide a service-based approach that enables the explicit designation of acceptable service level standards and the inclusion of relative importance weighting for individuals and areas throughout the building.

This system enjoys advantages that arise from the tiered structure and use of utility curves at zone and building server. While most currently available technologies are either entirely centralized or entirely distributed, the tiered structure of this system allows for a centralized information repository and communication with the building manager as to the explicit performance tradeoff for energy use reduction while still providing rapid updating and response times locally. The utility curves allow for efficient trading to ensure a high degree of performance even in an energy constrained scenario. Implementing the prototype system wirelessly makes this system ideal for retrofit applications and for use in reconfigurable spaces due to the comparatively high cost of wired installation.

BRIEF DESCRIPTION OF THE DRAWINGS

FIG. 1 is a flow diagram showing an outline of a method for building lighting control according to an embodiment of the invention.

DETAILED DESCRIPTION

FIG. 1 is a flow diagram showing an outline of a method for building lighting control according to an embodiment of the invention. The method may be implemented by a system as shown in the schematic block diagram of FIG. 2. According to this embodiment, the lighting control system is comprised of three levels. At the base level are distributed sensing units 210, 214, 218, 222 tasked with obtaining the current light level, allowing the occupant to request a preferred light level, and sensing occupancy (i.e., determining whether an occupant is present). Also included in the base level of the system are control units 212, 216, 220, 224 capable of dimming the lighting in the space. At the middle level are zone managers 202, 204 each of which coordinates the sensing units and control units in its zone. A zone may be defined as a large shared office space or several smaller offices within a building. Ideally the zones are photo-isolated from one another, although small levels of cross-zone light sharing is anticipated in the real-world case and is not anticipated to significantly impact system performance. The zone managers 202, 204 request sensor readings from the sensing units, use this information to perform a linear or quadratic programming algorithm to determine the optimal settings of the lamps, and update the settings of the control units. At the top level of the system is the building server computer 200 which is responsible for coordinating the zone managers and allocating building-wide energy resources to the zones based on their utility curves. Using a greedy algorithm for initial energy allocation and a utility-based trading algorithm for subsequent allocations, the building server tracks and restricts as necessary the building-wide energy use. The building level allocation computation takes place periodically and preferably less frequently than the utility curve calculation by the zone controllers. The timing of these building-wide updates can either be set by a timer or be event driven by requests from the zones when they observe significant changes to their needs.

Figure 2:
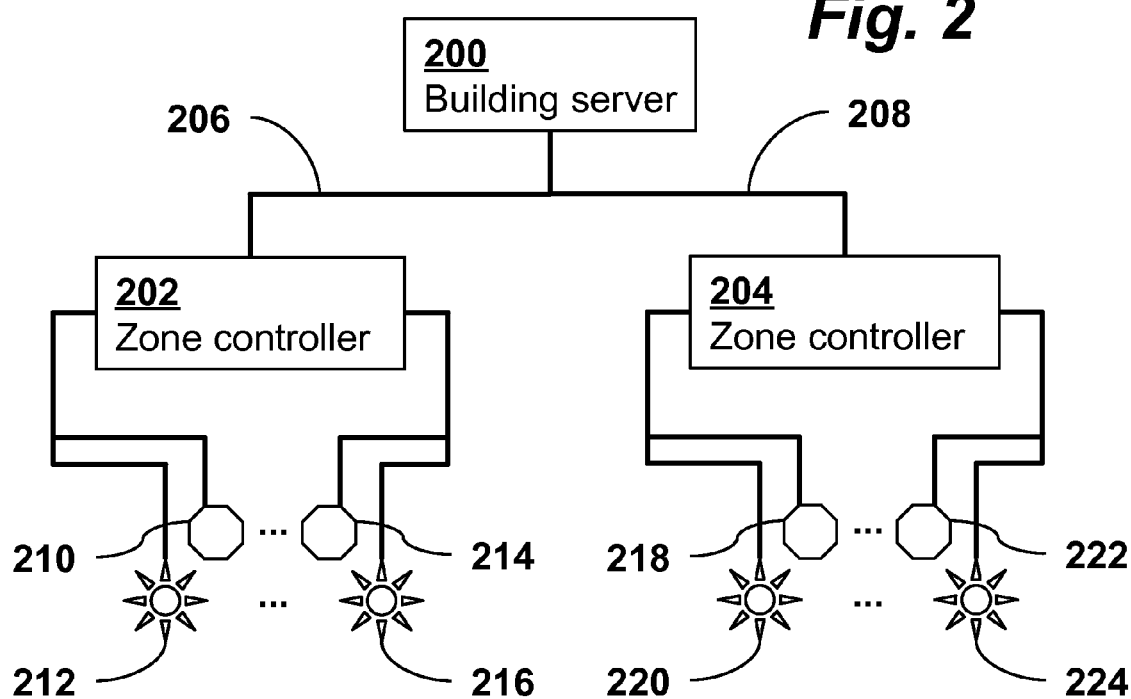
FIG. 2 is a schematic block diagram of a building lighting control system according to an embodiment of the invention.

The operation of the system of FIG. 2 is outlined in the flow chart of FIG. 1. In step 100, the zone controller collects occupant lighting preferences and light levels from sensing units distributed in the zone. In step 102, the zone controller computes a utility curve for the zone, where the utility curve represents the relationship between energy use and service level provided to occupants of the zone. In step 104, the zone controller sends the utility curve for the zone to the building server. In step 106, the building server receives the zone utility curve as well as all other utility curves from all the zone controllers in the building, whose zone controllers have similarly performed steps 100, 102, 104. In step 108, the building server allocates energy units to the zones based on the utility curves using a utility-based trading algorithm in order to optimize service levels with minimal energy. In some cases, an initial allocation may use a modified greedy algorithm. The allocation is communicated to the zone controllers, and in step 110, each zone controller distributes energy to lights in its zone using a linear or quadratic algorithm which calculates the energy for each light controller based on energy units allocated to the zone by the building server and based also on influence matrices representing the influences of the lights in the zone upon the sensors in the zone.

The influence matrices may be computed at commissioning of the system. The influence matrices for each zone are stored by the zone controller and contain information that represents the influence of each lamp upon each sensor. This information provides the zone manager with the ability to separate artificial light and natural light contributions at all time steps. The contributions from artificial light and natural sunlight should take into consideration their different spectral power distributions, as well as the difference between the sensor response and the response of the human eye. For example, in some implementations, the sensor response in voltage output is linear with the level of irradiance from each source as both the response curve and the distribution of radiation from both sources are constant. Because the design of the system allows for the determination of the measured incident radiation due to the artificial source, the contribution to the sensor reading from natural light can be determined and thus the total sensor response can be decomposed into artificial and natural contributions. With the sensor response decomposed thusly, the contribution of each source to the human eye response can be evaluated similarly. In some implementations, for example, the visible light contributions from the two sources are determined by calculating transformation factors. These factors may be evaluated by comparing the numerical integral of the original emittance and spectral power distribution curves with the product of these curves and the relevant response curve. By comparing the results from the eye response curve and sensor response curve computations, the measured sensor response can be converted to the equivalent visible spectrum value.

The zone manager runs an optimization algorithm over a range of maximum zone energy values, starting from zero energy units and increasing to the energy required for the zone to be fully on, and computes the zone utility for each level of energy. This result defines the zone utility curve which represents the explicit relationship between energy use and performance for the zone and illustrates potential for performance improvement or decline based on marginal increases or decreases in energy units allocated to the zone.

Embodiments of the invention may use any of various forms of standard wired or wireless protocols for communication between components of the distributed system. For example, in some embodiments, the communication takes place over a low-rate wireless personal area network, e.g., using the IEEE 802.15.4 standard. In particular, the wireless network is used by communication links 206 and 208 between the building server and zone controllers, as well as by links between the zone controllers and the control units and sensing units in their zones. The wireless implementation facilitates use in both retrofit and new construction as well as to be flexible for reconfigurable spaces.

Figure 3:
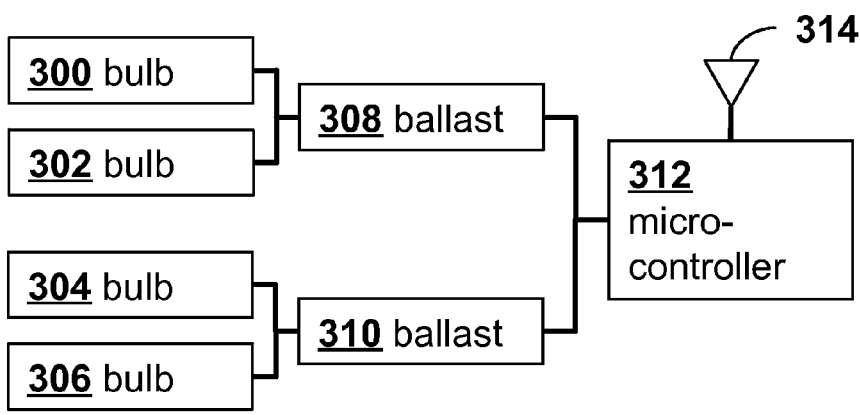
FIG. 3 is a block diagram of a control unit according to an embodiment of the invention.
Figure 4:
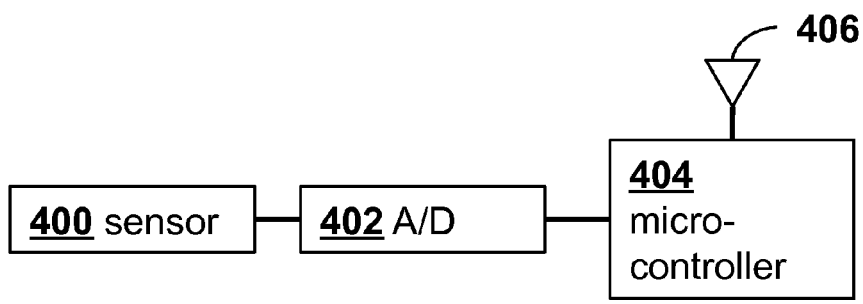
FIG. 4 is a block diagram of a sensing unit according to an embodiment of the invention.

FIGS. 3 and 4 show block diagrams of a control unit and light sensing unit, respectively. These units are preferably implemented as separate, stand-alone devices, but may alternatively be integrated as a single board capable of both sensing and control functionality with a shared 2.4 GHz radio for wireless communication. As shown in FIG. 3, the light control unit has a micro-controller 312 with antenna 314. As triggered by signals from the zone controller, lighting control signals are sent to dimming ballast 308 for bulbs 300 and 302 and to dimming ballast 310 for bulbs 304 and 306. As shown in FIG. 4, the light sensing unit includes micro-controller 404 with antenna 406. Signals from light sensor 400 are converted from analog to digital format by A/D 402 and received for processing by micro-controller 404. The light sensing unit may also include inputs from an occupancy sensor and from an occupant preferences input user interface. Occupant preferences could also be specified by the occupant using a web-based interface to the zone controller or building controller. Occupancy sensors may use sound responsive technology, passive infrared technology, ultrasonic technology, or a combination of these. Triggered by a request from the zone controller, the sensing unit collects and reports to the zone controller requested light level, occupancy state, and occupant preference data.

Figure 5:
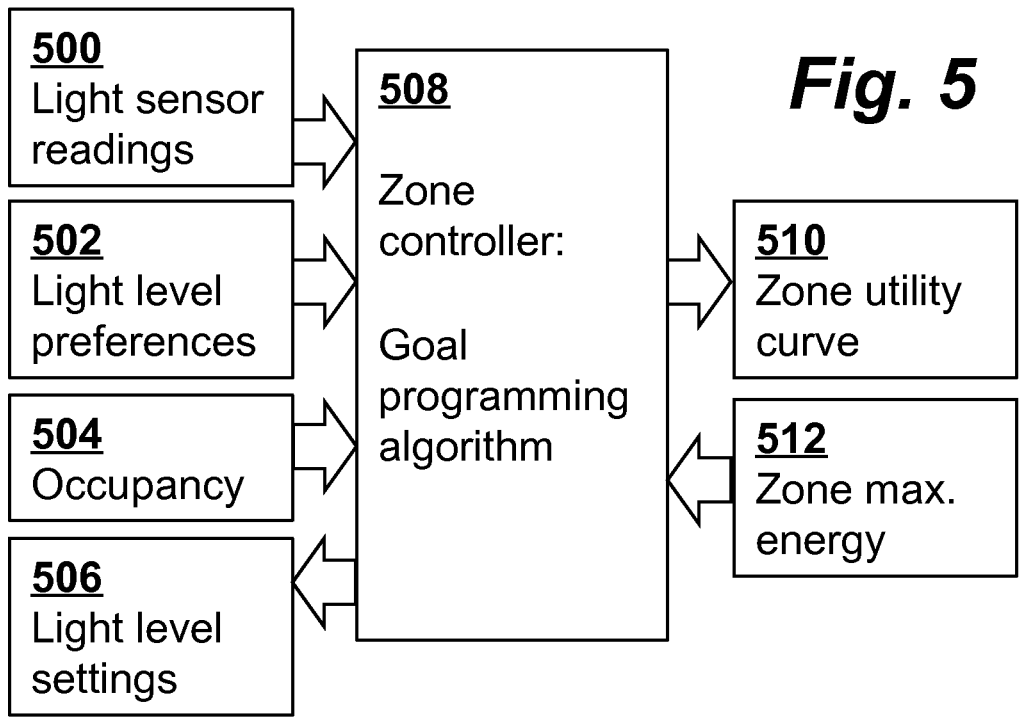
FIG. 5 illustrates the flow of information and processing at the zone level of the system according to an embodiment of the invention.

FIG. 5 illustrates the flow of information and processing at the zone level of the system according to an embodiment of the invention. Light sensor readings 500, occupant light level preferences 502, and occupancy sensor readings 504 are sent from sensor units to the zone controller 508 for processing. The zone controller computes a zone utility curve 510 that is sent to the building server which computes the zone energy allocation. The zone controller 508 receives from the building server the maximum energy allocation 512 for the zone. The zone controller 508 computes light level settings sends the light level settings 508 to the light control units in the zone. Analogous information flows between the zone controller 508 and other sensor units and controller units in the zone.

Figure 7:
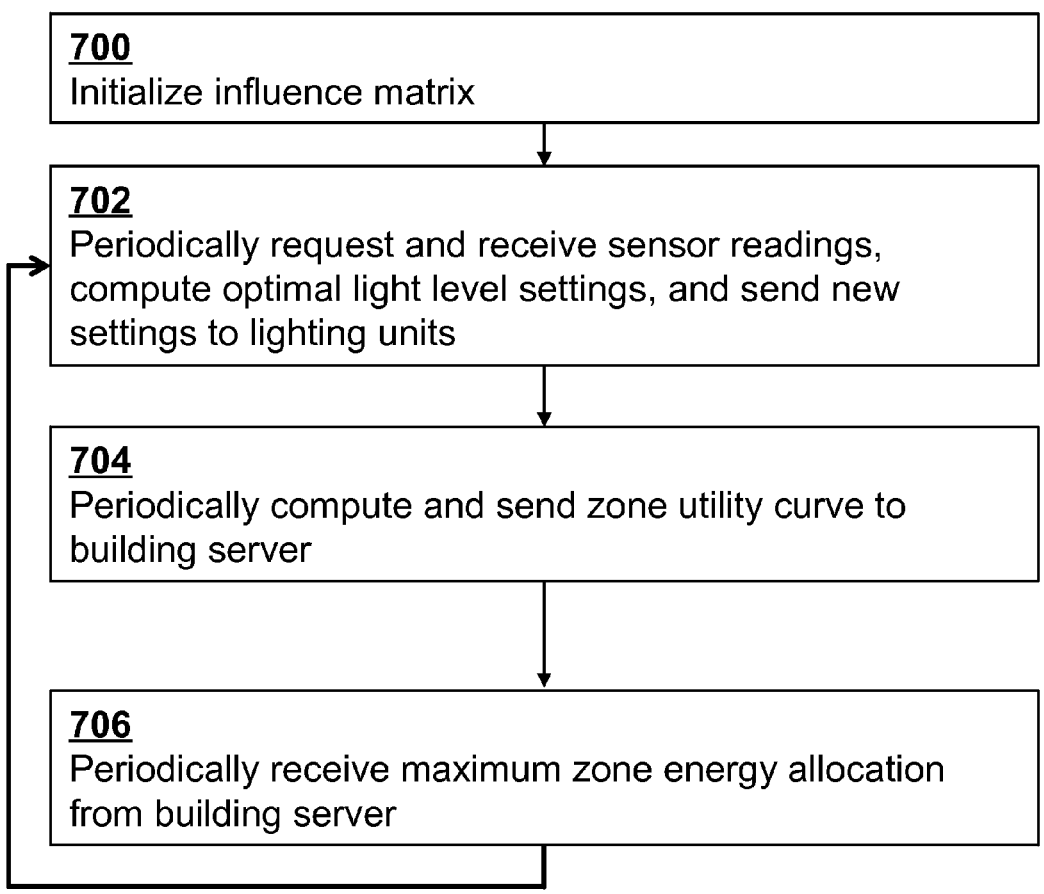
FIG. 7 outlines processing of a zone controller according to an embodiment of the invention.

Illuminance level readings 500 are used for calculating daylight contribution and initially for determining the influence of each light to each point of importance. The preferred illuminance level 502 is used as the target light level for the optimization scheme and occupancy status 504 is used for determining whether the occupant preference is incorporated into the particular round of optimization calculations. If the space is unoccupied, the individual preference is irrelevant and that constraint can be removed from the calculation. FIG. 7 outlines processing of a zone controller according to an embodiment of the invention. In step 700 the zone controller initializes an influence matrix for the zone. The influence matrix represents the contribution of light from each lamp in the zone at full output to each sensor. This initialization process first turns off all lights in the zone. A light level measurement is then taken from each sensor and used as a baseline background light level. The lamps are then turned on individually in sequence, and a sensor reading is taken from each unit. The difference between the off measurement and the on measurement is recorded as the entry in the influence matrix. The initialization process is entirely automated and can be performed at regular intervals to account for lighting system degradation and can be initiated when a zone is renovated or reconfigured to immediately update the system.

In step 702 the zone controller periodically requests and receives from sensor units in its zone sensor readings, including light levels, occupancy state, and occupant light level preferences. The zone controller then computes optimal light level settings and sends updated light level settings to lighting control units in the zone. This computation of light level settings is preferably an optimization algorithm.

Optimization at the zone level has two purposes. The first is to assign the optimal lamp settings to each lamp in the zone considering both energy use and occupant preferences.

The second purpose is to create an energy use utility curve for the zone to be shared with the building server. In order to accomplish both of these tasks, the zone manager calculates the optimal light settings given the current sensor measurements for a range of energy use. A metric of the error in meeting the preferences for each of these energy use values is defined as the zone utility. The discrete function of these utility values versus their respective energy consumption values defines the zone utility curve.

Figure 9:
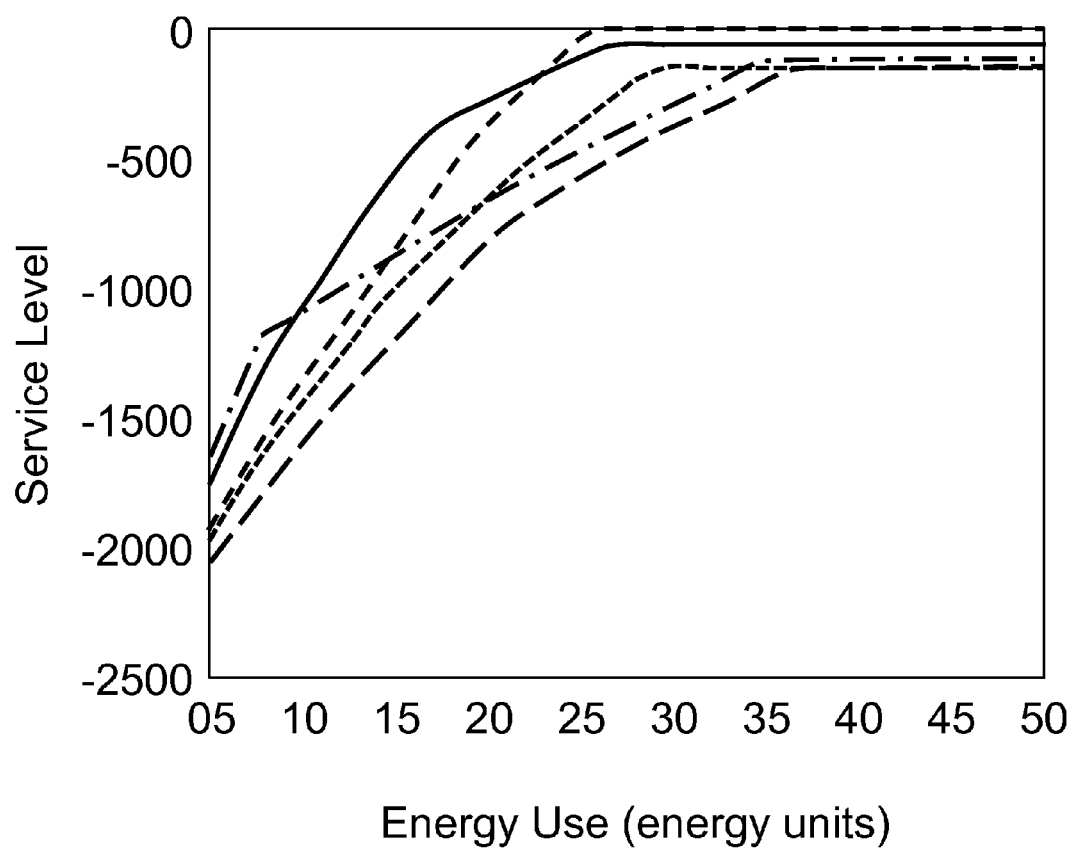
FIG. 9 is a graph of service level vs. energy use illustrating energy use utility curves for several zones in a building according to an embodiment of the invention.

Preferably, the optimization algorithm implemented on the energy units may be a linear programming algorithm utilizing the Dantzig simplex method. In this instance, the linear program is set up to minimize the difference between the requested light level and the actual level of light seen at each sensor, constrained by a maximum energy level allocated to the zone. This maximum energy level maybe varied, for example, from one tenth of the maximum possible energy use in the zone to the maximum allowable zone energy level as set by the building server. The sum of the error in meeting the requested light level is stored as the utility for each energy value. FIG. 9, for example, illustrates energy use utility curves for several zones in a building.

In one embodiment, the linear programming problem may be formulated with the goal of ensuring that all occupants receive at least the amount of light they request. No penalty is assigned for excess light. The linear program can be structured as follows:

Minimize $$\sum_{i=1}^{M} p_i \varepsilon_i$$

subject to $$Ax + \varepsilon \geq b$$

$$\sum_{j=1}^{N} x_j \leq E$$

where

A is a matrix with dimensions M×N and is the influence matrix capturing the illuminance from each lamp to each sensor for a fully-on setting; each row represents one of M sensors and each column represents one of N lamps, b is a vector of the artificial light levels required to meet the occupant-specified target levels, where $b_i > 0$, x is a vector of the fractional settings of all lamps in the zone, $\varepsilon$ is a vector of the error in meeting the occupant-specified light level for all sensors, E is the maximum level of energy (in terms of fractional light settings) allowed for the particular iteration, M is the number of sensors in the zone, N is the number of lamps, or individual control points, in the zone, and p is a vector of assigned participation weighting factors.

The vector p is to be used for two purposes: First, $p_i$ is set to zero if the respective occupant is not present to ignore the relevant constraint. Second, $p_i$ can be used to rank the importance of the sensor locations within the zone if desired.

To form the utility curve, the above program is solved for values of E up to the fully-on energy level for the zone or until $\epsilon$ reaches zero, whichever comes first. The shape of the curve shows how precipitously the performance of the system declines under energy use restriction.

The influence matrix A is formed for each zone during building commissioning and is stored by the zone manager. To take into account the deterioration in the system over time, a routine commissioning schedule to redefine A is recommended for long-term installations. Re-running the commissioning sequence is also required for any major changes to the layout of the room or movement of sensors or lamps. The influence matrix A is determined through the following steps:

1. Turn off all lamps in the zone.
2. Turn on one lamp.
3. Record sensor readings for all zone sensors.
4. Turn off the lamp.
5. Repeat steps 2 through 4 for all remaining lamps in the zone.
6. Record sensor readings for all zone sensors.
7. Subtract the values recorded in step 6 from all other readings, sensor by sensor.
8. Convert the remaining values to illuminance in units of lux and record in A.

The light level vector b is computed by taking the current voltage level readings from the sensors, subtracting the expected voltage level due to the current light settings, transforming the remaining voltage values into equivalent sunlight illuminance, and subtracting the resultant sunlight illuminance from the occupant-specified light preference level. If more sunlight is provided than is desired, the computed value for that element of vector b would be negative; however, negative illuminance cannot be provided by the system and as such these values for b are set to zero to better represent the physical system behavior and to allow the zone manager to stop running iterations once the value of the objective function reaches zero. Because the objective function is a sum of the error terms, the solution to the program is unchanged by this alteration.

The vector x contains the dimming fractions for all lamps in the zone. The values in vector x for the iteration with the maximum zone energy allowed, as established by the building server, are used as the next lamp settings unless the value of the objective function reaches zero at a lower energy level in which case the settings for that level of energy use are used.

To make use of the information regarding occupancy, the corresponding row of matrix A and vector b is removed for any non-present occupant. If a minimum light level were preferred in the absence of particular occupants, this minimum level could be substituted for the relevant entry in vector b while the corresponding row in matrix A would remain intact.

In other embodiments, instead of the one-sided linear programming technique described above, a two-sided linear programming technique may be used, or a two-sided quadratic programming technique. The two-sided linear program minimizes a weighted sum of the absolute value of the difference between the target and actual light levels to incorporate penalties for providing more light than specified by the target. The two-sided quadratic program minimizes a weighted sum of the squares of the difference between the target and actual light levels to penalize large differences.

Triggered by a request from the building server, in step 704 the zone controller sends to the building manager a zone utility curve. In step 706, the zone controller receives from the building server a maximum zone energy allocation. FIG. 7 shows steps 702, 704, 706 being repeated sequentially, although it should be noted that each of these steps may be repeatedly performed independently and non-sequentially at different periodic intervals. The steps may also be performed in response to requests or commands from the building server.

While the zone-level control is important to ensuring rapid response to local changes in the system, a building-level server provides for performance tracking and resource use decision making The total building-wide energy use over time is of interest for operating cost projection and minimization, demand response, and system- wide performance management purposes. The ability of the building to maintain a high quality occupant experience is also important as the productivity of the occupants is of significant value to the building owner or lease holder.

Figure 6:
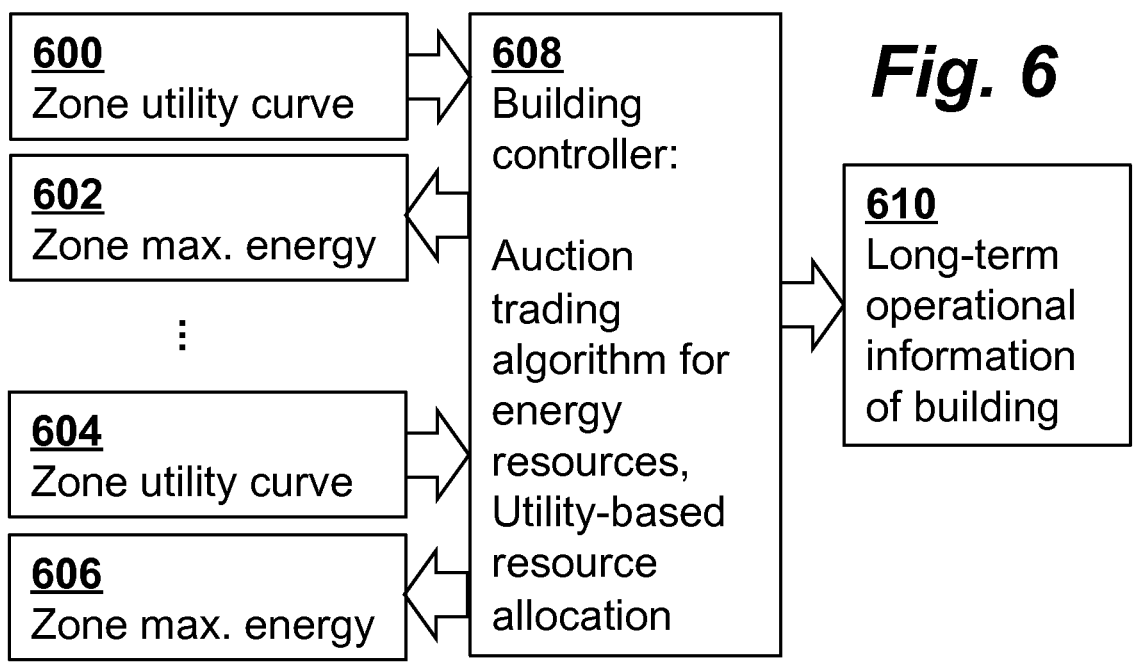
FIG. 6 illustrates the flow of information and processing at the building level of the system according to an embodiment of the invention.

FIG. 6 illustrates the flow of information and processing at the building level of the system according to an embodiment of the invention. The building controller 608 receives zone utility curves from multiple zone controllers, e.g., zone utility curves 600 and 604. (See also FIG. 9.) The building controller then allocates energy to the zones and sends to the multiple zone controllers maximum energy allocations, e.g., energy allocations 602 and 606. The building controller 608 also computes and outputs long-term operational information of the building 610 which can be viewed and used by a building manager. The centralized building server provides relevant building performance information to the building manager and allows performance standards and energy use limits for the building system to be set. At this level, the building manager has the options to set the following building-wide parameters:

Maximum building energy use under normal conditions
Maximum building energy use under demand response conditions
Minimum utility value for each zone under normal conditions
Minimum utility value for each zone under demand response conditions These parameters can either be stationary or can be set on a schedule.

The ability to set these parameters explicitly allows the building manager to consider how limiting energy use impacts the occupant experience. For example, the energy use restrictions may conflict with the minimum utility standard. When setting the parameter values, the building manager may choose to set conditional maximums such that more energy use is allowed if the utility of a zone drops below an absolute minimum threshold. The manager may also choose to prioritize some zones over others. For instance, it may be less impactful to the building under an energy constrained scenario to reduce the performance of a hallway or corridor zone instead of an office space. By setting the minimum performance standards by zone, the manager can determine the relative importance of the zones while still enforcing minimum standards.

By viewing the energy use as an explicit tradeoff to a defined performance metric, the incremental cost per performance level change can be evaluated. Accordingly, in some embodiments, the building server is placed in communication with a real-time pricing information system, enabling cost-based decision making An integrated pricing also enables the building manager to set maximum expenditures for energy throughout the day. When energy is cheap, for example, it may be advantageous to set a very high performance standard, but in the middle of the day at peak pricing, a slightly lower standard could significantly reduce operating costs. Monitoring this data over time can give the building owners or lease holders information about the premium paid for various service quality levels.

This system also provides a secondary benefit to the building manager in that it helps in pointing out inefficiently constructed zones or zones where maintenance such as bulb replacement may be necessary. An inefficiently arranged zone will require a higher fraction of total energy use to obtain the same performance level as other zones located in similar areas of the building. Depending on the flexibility of the room layout, an alternative layout may be worthy of consideration if the current layout is performing poorly. Additionally, in looking at the progression of utility curves over time, if a zone requires increasing quantities of energy to maintain the same level of performance, normalized for weather changes, the bulbs may be nearing their end of life and require replacement.

Figure 8:
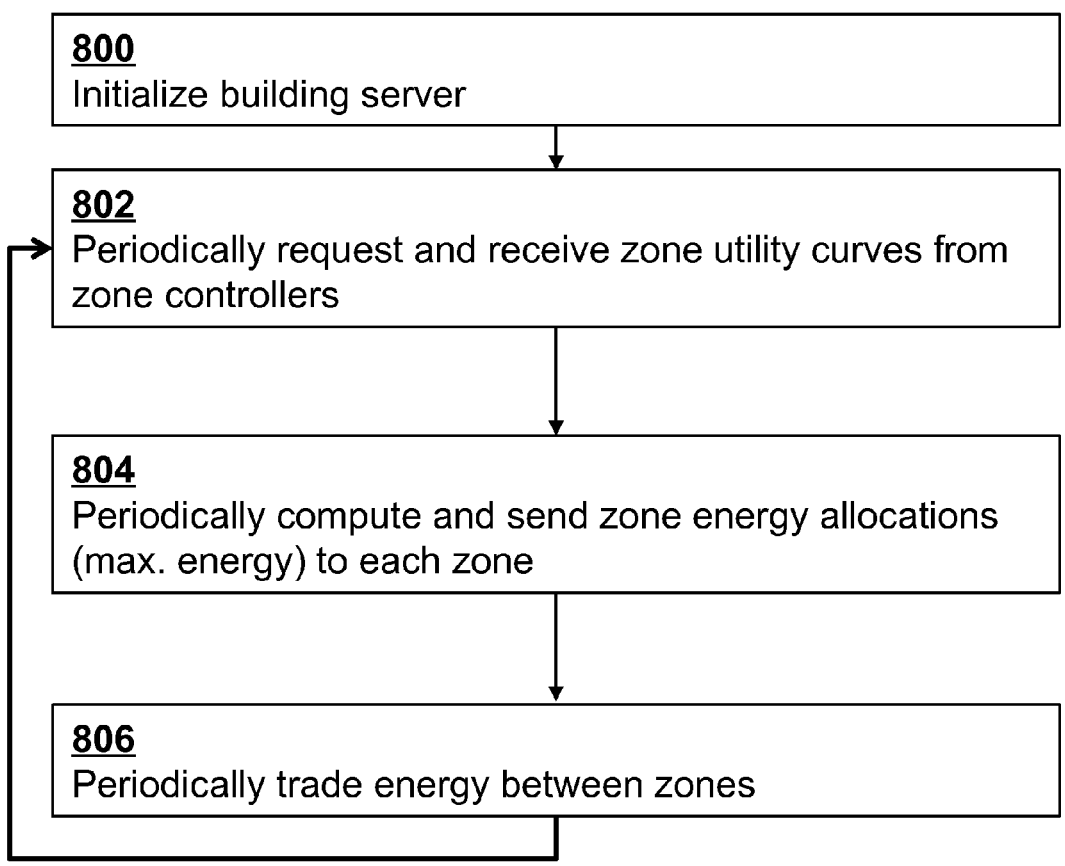
FIG. 8 outlines processing of the building server according to an embodiment of the invention.

FIG. 8 outlines processing of the building server according to an embodiment of the invention. In step 800 the building server is initialized, which includes establishing connections with zone controllers in the building. In step 802 the building server periodically requests and receives from the zone controllers their zone utility curves.

After sending a request to the zone controllers, the building server may need to wait until the zone controllers collect the sensor information from their sensing units, build their respective influence matrices and create their utility curves. In step 804 the building server periodically computes and sends to each zone the maximum energy allocations for the zone. This energy allocation computation uses the preset maximum building energy use and the zone-provided utility cures to allocate energy units to the zones. The initial resource allocation is computed using a modified greedy algorithm with units of energy assigned to zones with the highest marginal utility.

The allocation at this level is determined by a modified greedy algorithm on the basis of the zone utility curves. While with a traditional greedy algorithm the next increment of the resource is allocated to whomever demonstrates the largest immediate need, this modified version allows the building server to look up to five steps in the future to assess the potential for increased utility based on increased energy allocation. While only one energy unit is allocated at a time, the unit is allocated to the zone with the highest average utility increase per unit if a predetermined number of additional energy units (e.g., 1 to 5). For example, the utility increase may be calculated and averaged for one, two, three, four, and five additional units of energy and the highest of these averages is the number the zone uses to compete against the other zones. The incorporation of this forward-looking perspective helps to ensure that zones do not get trapped on low or intermediate level plateaus in their curves and instead are able to take advantage of steeper points in their respective curves. The five step forward cutoff is selected based on the scale of the problems considered and the size of the energy units selected. Five steps is equivalent to half the power of a fully on lamp. The utility curve values are stored as a vector of values for each zone with the vector length determined by the number of occupants, or sensors, per zone, and throughout the energy allocation, a counter variable stores the position along the curve and the number of energy units that have been assigned to each zone. This counter is updated at each unit allocation to reflect the new allocation profile for the next iteration. Energy allocation stops when either the maximum allowable building energy use is reached or the zones are all fulfilled above a threshold utility level.

To facilitate additional demands on the zones that may occur before the next update, any energy units remaining after the zones are assigned enough energy units to reach the top of their curves are divided among the zones. The zone managers automatically limit their zone energy use to the minimum necessary to fulfill the demand so these additional units will only be used if the demand increases during the next interval. The building server, however, stores the actual original energy unit assignment value as the starting point for subsequent energy trading.

In step 806 the building server periodically manages trading of energy between the zones. Using the zone utility curves, maximum building energy use, and the previous zone energy allocations, the building server allows zones to trade energy units for the next allocation cycle.

Figure 10:
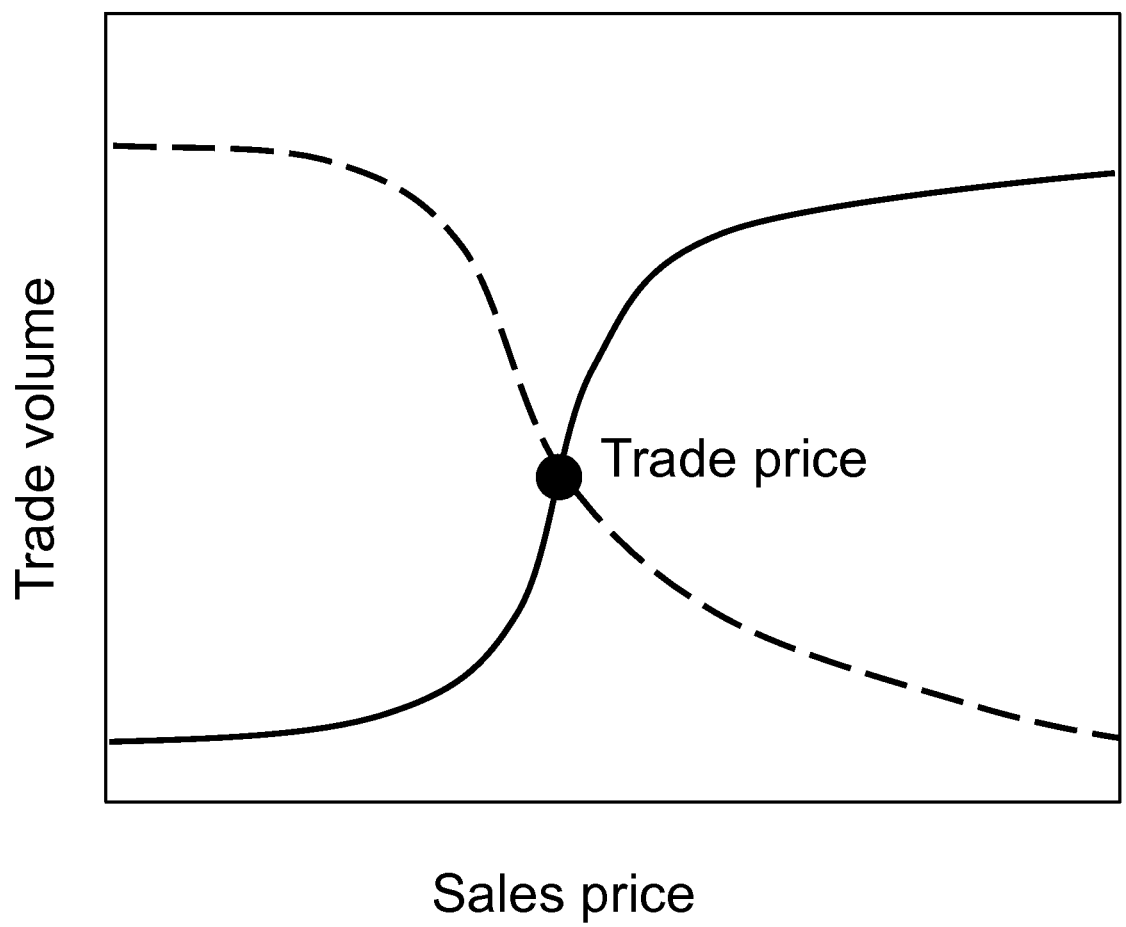
FIG. 10 is a graph of trade volume vs. sales price illustrating an energy unit trading scheme between zones according to an embodiment of the invention.

In the energy trading rounds, the units start at their previous energy allocation levels and trade energy units based on relative utility level. The zones are divided into prospective buyers and sellers based on where they fall with respect to the average utility level, those who fall below are buyers and those who are above are sellers. There is no actual currency in the exchange of energy units; instead the units are exchanged based on the value each zone places on the particular unit of energy. In order for the buyers to "purchase" energy units from the sellers, their "buying price" is calculated in the same way the value was computed in the original energy allocation. The sales price for the sellers is similarly computed but is taken as the minimum average loss over losing up to three units of energy. In order for the exchange to take place, the buyer has to be willing to pay more than what the seller is offering. The trading could be designed in two ways. In one auction-style approach, the highest bidders buy from the lowest sellers until no buyers are willing to pay the purchase price. This is illustrated in the graph of FIG. 10, where the dashed line represents the number of shares a buyer would be willing to buy at a certain price, and the solid line represents the number of shares a seller would be willing to sell at the price. Where the two lines intersect indicates the number of trades and the price of the trades. In an alternative trading scheme, the maximum number of transactions can be forced to occur by matching as many buyer-seller pairs as possible. This second method may be selected to allow as many transactions to occur as possible per round.

This buying and selling process continues iteratively until there are no buyers willing to pay what the sellers require or the trading results in back-and-forth cycling. At this point, zones with more energy units allocated than they need to remain at the peak of the utility curve are stripped of their extra units. After this process is finished, any additionally available energy units are allocated in an identical manner to the original allocation scheme, first according to utility and then disbursed evenly to give room for increased demand.

An energy unit may be defined, for example, as equivalent to 10% of fully-on energy for a single lamp for the building-wide allocation. The zone curves are also constructed at this increment for continuity. Because the zones communicate their utility curves as a vector of utility values, it is important that these two levels are consistent in their definitions of energy unit.

FIG. 8 shows steps 802, 804, 806 being repeated sequentially, although it should be noted that each of these steps may be repeatedly performed independently and non-sequentially at different periodic intervals.

Variations of the embodiments discussed herein will be evident to those skilled in the art based on the teachings of the invention. Because this system is developed around defining utility metrics for energy use for a lighting subsystem, similar techniques can define energy use utility for other building subsystems to allow the building-wide allocation system to manage multiple subsystems. The linear programming optimization algorithm could be implemented instead as a constrained least-squares quadratic program or other algorithm.

With the development of occupant interfaces on personal desktop computers for building management purposes, the occupancy and light level preference data could be gleaned in new ways without requiring additional sensor hardware. Thus, in some embodiments, a light level sensor and/or an occupancy sensor may be connected to or integrated as part of a computer workstation and provide the sensing functions of the sensing units, and the sensor information could be transmitted to the building server via the building computer network. The occupant light level preferences could also be provided via the same computer using a custom application or web application in communication with the building server.

The system preferably is implemented using an event-driven updating approach may provide less distraction and better response for the occupants. For example, the arrival of a previously absent occupant may necessitate a quick lighting scheme update so that the new person is not left in the dark waiting until the next timed update. A maximum threshold for the frequency of updates in such an implementation is also preferred. At the building level, reallocation could be triggered by either a zone request for additional energy resources or from a power company request for electricity usage curtailment. It may also be useful for some buildings to be able to set priorities on meeting demand for certain building segments. At the building-wide level, the zone utility curves can be scaled to give priority to some zones over others, but the user interface to obtain these preferences from the building manager would need to be developed. At the zone level, the mathematical programming formulations that set the optimal lighting scenarios incorporate weighting factors with respect to these priorities, but the ability to select priority sensor locations would require either an additional setting on the sensing units or backend access through the building management system for the building manager to set them directly. Additionally for sensor locations not assigned to specific individuals, such as hallway spaces, target light level settings can be selected using the same type of dimming interface used by occupants at their desks, but it may be preferable to allow internal preset target preferences for these types of units.

The present lighting control system may also be integrated with other building environmental control systems. If similar utility curves for other building systems requiring electricity resources are available, e.g., for cooling and ventilation systems, these systems could trade energy resources between them according to their respective utility curves. Combining multiple systems into a single resource allocation scheme enables building-wide prioritization of resources and gives the building more latitude in demand response participation.

Given the availability of real-time electricity pricing information, the tiered resource allocation system could also incorporate operating costs into the decision-making process at the top level. For example, when electricity is at a premium, a lower standard of performance may be acceptable than when it is inexpensive. Alternatively a permissible cost versus performance level tradeoff could be defined by the building manager to define when additional costs are warranted. In this way operating cost can be reduced beyond the savings available from standard system performance.

With performance information characterized by energy requirements and monetary value, buildings could potentially enter into cooperative energy reduction agreements where building-wide energy units are traded between buildings based on utility. There are companies which act as intermediaries in selling watts of energy in the form of usage decreases to energy providers by cutting the energy use of their client companies and paying the companies for conforming to the reduction. Inter-building trading would allow building owners to enter into demand response agreements with energy companies to restrict energy use during necessary times while preserving the ability to buy additional resources if necessary from other buildings that have entered into similar agreements but have less need for all of their resources at the specific time. Reciprocally, energy units allowed within the use reduction agreement that are not of large utility value to the building could be sold to other buildings in a manner analogous to a cap-and-trade scenario. Knowing the value of the energy units facilitates informed decision-making with regard to responding to a demand response event with knowledge of the monetary and performance consequences of all courses of action.

This system is designed to minimize energy use, incorporate individual preferences, and enable sophisticated demand response. Current systems are limited to occupancy sensors and basic daylight compensation strategies that do not account for the variety of preferences in a building which can lead to poor performance. They are also incapable of truly optimizing restricted energy resources across a building and cannot inform decision makers of the performance costs of energy use reduction. This system integrates all of these capabilities to reduce energy consumption, thereby reducing operating costs, while providing a quality occupant experience.

This energy allocation system integrates centralized and distributed optimization and decision-making to facilitate high quality building occupant experience and energy use minimization. Distributed sensing captures occupancy, light level preference, and current light levels and distributed control allows for tailored lighting scenarios which best meet the demands of the occupants. Centralized information allows for building-wide operating cost and system performance tracking and control and enables demand response initiation. It has applications to commercial office building energy control and management systems. With minor adaptations, energy management systems for other types of commercial buildings or industrial facilities. This approach minimizes energy use locally and building-wide; provides the building manager information regarding explicit tradeoff between energy use and building performance; ensures energy use restrictions are implemented in a least impactful manner; and provides periodic, automated commissioning and updating to capture lighting system degradation over time.

The invention claimed is:

1. A method for lighting control of a building, the method comprising:
   collecting by a zone controller occupant lighting preferences and light levels from light level sensors distributed in a zone;
   computing by the zone controller a utility curve for the zone, wherein the utility curve represents the relationship between energy use and service level provided to occupants of the zone;
   receiving by a building server zone utility curves from zone controllers distributed throughout the building, wherein the utility curves comprise the utility curve and the zone controllers comprise the zone controller;

allocating energy units by the building server to the zones based on the utility curves using a utility-based trading algorithm in order to optimize service levels with minimal energy;

distributing by the zone controller energy to lights in the zone based on energy units allocated to the zone by the building server and on influence matrices representing the influences of the lights in the zone upon the sensors in the zone.

2. The method of claim 1, further comprising:

supervising by the building server trading of energy units between the zones as the dynamics of the building change over time.

3. The method of claim 1, wherein:

the allocating energy units by the building server to the zones based on the utility curves uses a modified greedy algorithm for an initial allocation.

4. The method of claim 1, further comprising:

computing and outputting by the building server long-term operational information of the building.

5. The method of claim 1, further comprising:

computing by the building server from the allocated energy units a building energy use utility curve for lighting of the building.

* * * * *